May 16, 1961  E. KOTTSIEPER  2,984,306
HELICOPTER ROTOR HEAD AND ITS CONTROLS
Filed May 8, 1958  2 Sheets-Sheet 1
FIG. 1
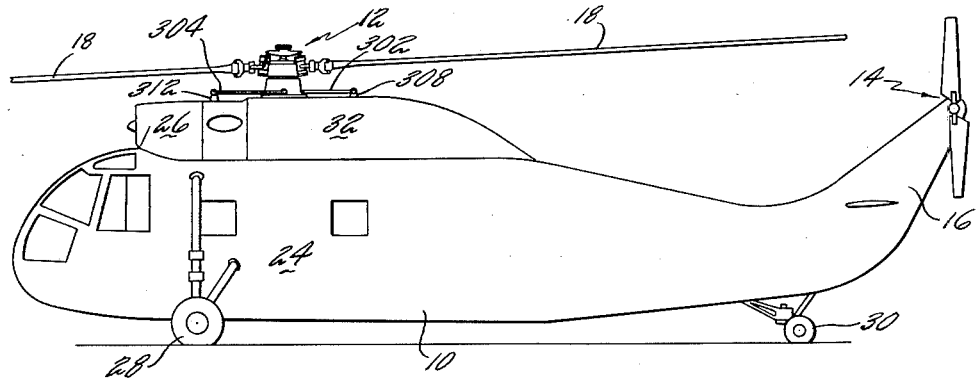
FIG. 3
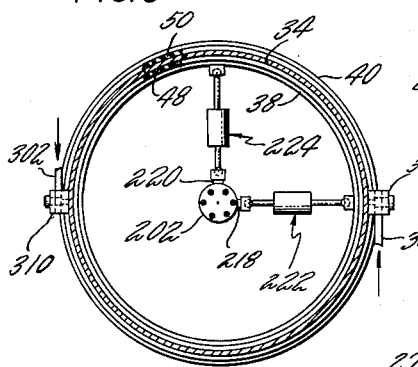
FIG. 4
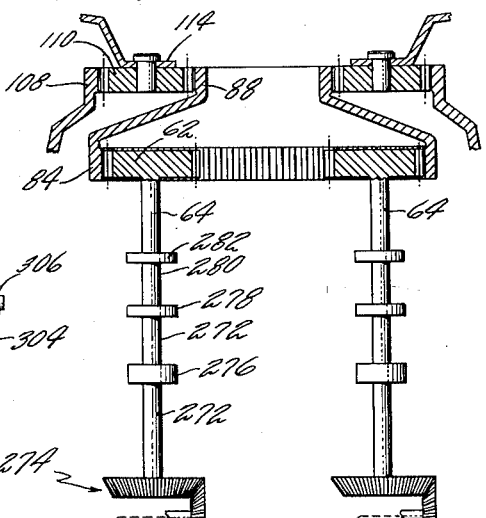
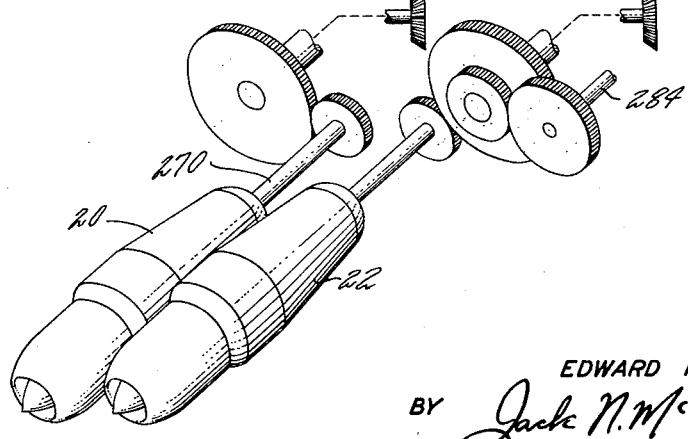
INVENTOR
EDWARD KOTTSIEPER
BY Jack N. McCarthy
AGENT

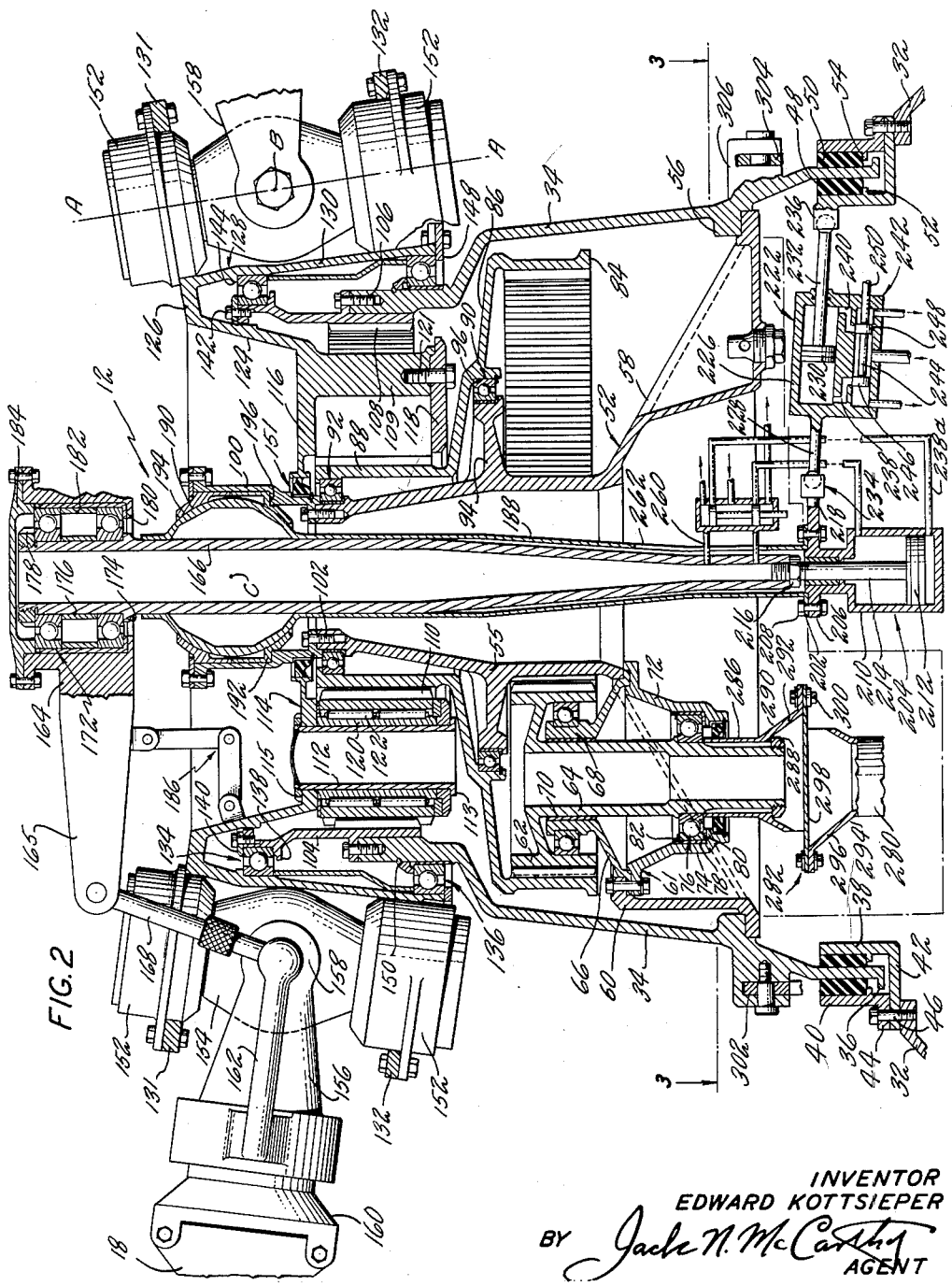

United States Patent Office 2,984,306
Patented May 16, 1961

2,984,306

HELICOPTER ROTOR HEAD AND ITS CONTROLS

Edward Kottsieper, Fairfield, Conn., assignor to United Aircraft Corporation, East Hartford, Conn., a corporation of Delaware Filed May 8, 1958, Ser. No. 733,893

18 Claims. (Cl. 170—135.75)

This invention relates to a rotor head for a helicopter and its controls.

An object of this invention is to provide a rotor head which will rotatably mount blades on a helicopter in a proper manner while providing a weight saving over rotor heads of known construction.

Another object of this invention is to provide a rotor head which is mounted to rotate about a non-rotatable mast or pillar.

A further object of this invention is to provide a rotor head which will function to autorotate in the event any torque shaft should break.

A further object of this invention is to provide a rotor head having a plurality of power inlets.

Another object of this invention is to provide a rotor head in which the number of power inlets can be easily varied providing driving flexibility.

Another object of this invention is to provide a rotor head which is flexibly mounted in an isolated manner from the fuselage.

Another object of this invention is to provide a rotor head in which the various hinge mountings of the blades may have more movement in position without affecting the stability of the helicopter.

A further object of this invention is to provide a rotor head having simplified controls.

These and other objects and advantages of the invention will be pointed out in connection with the following detailed description of the drawings. In these drawings:

Fig. 1 is a side elevation of a helicopter incorporating the invention;

Fig. 2 is an enlarged sectional view of the rotor head;

Fig. 3 is a view taken along the line 3—3 of Fig. 2;

Fig. 4 is a schematic view showing the relation of the two turbine powerplants to the driving shafts of the rotor head.

Referring to Fig. 1, the helicopter as shown has an extended fuselage 10, a single main sustaining rotor 12 and a torque compensating rotor 14 mounted on an upwardly extending pylon 16. Main rotor 12 includes variable pitch blades 18. Their connection to the rotor head, which forms part of this invention, along with the controls for operating the helicopter will be hereinafter described.

As seen herein, the powerplant for the helicopter comprises two turbine engines 20 and 22 which are mounted above the cargo or passenger compartment 24 of the helicopter in a faired nacelle 26. The rotor head is mounted on the pylon 32 which extends behind the nacelle. The landing gear for the helicopter comprises two forward wheels 28 along with their supporting struts and a tail wheel 30.

The rotor head is formed having a bell shaped housing 34 which is open on both ends. The lower end has an outwardly extending flange 36 which is located in an annular channel formed by two flange members 38 and 40 which extend upwardly from annular ring members 42 and 44, respectively. These ring members lie adjacent each other and are fixed to the pylon 32 of the helicopter by bolts 46. The lower end of the bell housing 34 is resiliently mounted in the channel by having a band of resilient material 48 bonded between the flange 40 and lower end of member 34 above flange 36 and a band of resilient material 50 bonded between the flange 38 and the lower end of member 34. The resilient bands 48 and 50 can be adhered by any satisfactory means desired. If rubber is used, it can be vulcanized to the member 34 and flanges 38 and 40. Annular projections 52 and 54 extend inwardly from members 38 and 40 towards the lower end of member 34 and below bands 48 and 50, respectively, to aid in supporting the resilient bands in shear and prevent the member 34 from being pulled upwardly out of the channel.

Fixed within said bell shaped housing 34 is a drive supporting member 52. This member includes an upstanding open ended tubular member 55 having its axis coinciding with the axis of the bell shaped housing 34. Tubular member 55 is fixed to an inner flange 56 on housing 34 by a frusto-conical section 58. This conical section 58 has a raised portion 60 for each drive shaft extending into the underside of bell shaped housing 34. A recess is shown in the conical member 58 to provide oil access means.

In Fig. 2, only one raised portion 60 is shown in view of the fact that the figure is not taken in one plane. This has been done to show in one figure the drive means for the rotor and the control means.

In each raised portion 60, a mounting 61 is provided for rotatably supporting a shaft gear 62 and its shaft 64. This mounting 61 comprises an upper member 66 which is fixed to member 52 and has a cylindrical portion 68 extending upwardly therefrom. A plane annular bearing 70 is fixedly positioned within said cylindrical member 68. This bearing is positioned around the upper part of shaft 64 adjacent the shaft gear 62. Mounting 61 also comprises a lower member 72 which is fixed to member 52 and has a cylindrical portion 74 in which a ball bearing assembly 76 is mounted. The outer ring of the bearing is positioned in a bushing 78 fixed within cylindrical portion 74. An inwardly extending flange 80 supports the bottom of the outer ring of the bearing and a snap ring 82 is positioned in a recess in bushing 78 above the outer ring to hold it in place. Bushing 78 extends over flange 80. The inner ring of the ball bearing assembly is fixed to the shaft 64 in a manner to be hereinafter described.

A ring gear 84 is positioned around the shaft gears 62 and engages them in a meshing contact. The top of ring gear 84 has an inwardly extending flange 86 which connects it to the bottom of a sun gear 88. Ring gear 84 and sun gear 88 are mounted for rotation on two bearing units 90 and 92. Bearing unit 90 is mounted between an annular flange 94 extending from tubular member 55 and an annular surface 96 on inwardly extending flange 86. The outer edge of the bearing unit 90 is fixed between a portion of the flange and a snap ring. The inner edge of the bearing unit 90 is positioned in a bushing fixed to the flange 94 which also includes an outwardly extending lip under the inner edge of the bearing. Bearing unit 92 is mounted between the upper end of tubular member 55 and the upper end of sun gear 88. The inner edge of bearing unit 92 is positioned in a bushing fixed in the upper end of member 55, which has a lip extending outwardly below the lower side of the inner edge of the bearing unit. The upper side of the inner edge of the bearing unit is held in position by an annular projection 98 which extends downwardly from a ball joint housing 100 which is fixed to the top of member 55 by bolts 102. The upper end of sun gear 88 has an inwardly extending flange which is positioned around the upper side of the outer edge of bearing unit 92.

An extension 104 is fixed to the upper end of bell shaped housing 34 by a plurality of bolts 106. A ring gear 108 is formed integral with the inner surface of said extension and positioned in a plane with sun gear 88. A plurality of pinion gears 110 is positioned between the sun gear 88 and ring gear 108 having a meshing contact with both gears. These pinion gears 110 are rotatably mounted on fixed pinion shafts 112 which are fixed in a rotor head case 114. The fixed pinion shafts 112 extend between annular members 116 and 118 of the cage 114. Member 116 is located over the annular space between gears 88 and 108 and member 118 is located below this space. Arms 109 extend between annular members 116 and 118 fixedly positioning them with respect to each other. These arms are integral with member 116 and connected to member 118 by bolts 121. An inner ring 120 is positioned around each shaft 112 and held between members 116 and 118. The inner part of pinion gear 110 serves as the outer ring for the needle bearing unit. Bearing washers are located between the upper and lower ends of the pinion gear 110 and the members 116 and 118, respectively, of cage 114. Needles 122 are located between the inner and outer rings of the needle bearing unit. Each shaft 112 has a flange 113 extending around the edge of the opening in the member 118 through which it extends and a nut 115 threadably secured to its other end about the opening in member 116 through which it extends.

The outer edge of annular member 116 of the rotor head cage 114 has an upwardly extending annular flange 124 which is connected by an outwardly extending flange 126 to the blade mounting section 128 of the cage 114. This blade mounting section 128 is formed as a large flange 130 extending downwardly from the outer edge of flange 126 with sets of arms 131 and 132 extending from the top and bottom of the flange 130 where a blade is to be mounted.

Cage 114 and section 128 are mounted for rotation on two bearing units 134 and 136. Upper bearing unit 134 is located between the inside of flange 130 adjacent its upper end and the upper end of extension 104 of bell shaped housing 34. The lower bearing unit 136 is located between the lower end of flange 130 and a point adjacent the upper end of bell shaped housing 34. The inner ring of the upper bearing unit 134 is fixedly positioned between an annular projection 138 extending outwardly from extension 104 and an annular washer 140 which is bolted to the upper end of extension 104 by bolts 142 and overlaps the upper part of the inner ring. The outer ring of upper bearing unit 134 is fixedly positioned on the inner side of flange 130 between an annular projection 144 and a spacer member 146. The spacer member 146 engages the bottom of the outer ring of the upper bearing 134 and extends to the top of the outer ring of the lower bearing unit 136. An annular washer 148 is bolted to the lower end of flange 130 and overlaps the lower part of the outer ring of the lower bearing unit 136. The inner ring of the lower bearing unit 136 has a bushing member located between its inner face and the outer portion of the top of the bell shaped housing 34. An annular member is positioned against the top of the inner ring of the lower bearing unit 136 and prevented against axial movement upwardly by a snap ring 150. A sealing unit 151 is positioned between the inner edge of annular member 116 and the bottom of ball joint housing 100.

A bearing cartridge 152 is fixedly mounted in each arm 131 and 132. A drag hinge 154 is rotatably supported in each pair of cooperating cartridges 152 about an axis "A." A flapping link 156 is connected to each drag hinge by a bifurcated portion 158 which extends about the drag hinge 154 and is pivotally attached thereto for movement about an axis "B." A blade attaching member 160 is rotatably mounted on the free end of each flapping link 156 so that the blade 18 which is attached thereto can be rotated in a pitch changing movement. A horn member 162 extends from blade attaching member 160 to provide a control connection to cyclically and collectively change blade pitch. The free end of horn 162 is attached for control movement in a manner to be hereinafter described. A similar mounting permitting a dragging and flapping movement of a blade along with a pitch changing action is shown in U.S. Patent No. 2,755,872.

A star member 164 having one outstanding arm 165 for each blade horn 162 is rotatably mounted on a shaft 166. A link 168 connects the free end of each arm 165 with its cooperating horn 162. These links are universally connected at each end with their arm 165 and horn 162 and are capable of being varied in length. Two bearing units 170 and 172 are located between the star member 164 and shaft 166. The inner ring of the lower bearing 170 is positioned against an annular projection 174 on the shaft 166 and a spacer member 176 is placed around the shaft 166 with its lower end against the upper side of the inner ring of bearing unit 170. The inner ring of the upper bearing unit 172 is positioned against the upper end of the spacer member 176 and a nut 178 is threadedly secured on the upper end of shaft 166 against the upper side of the inner ring of bearing unit 172. The inner surface of the opening in star member 164 into which shaft 166 extends is lined with a bushing. The outer ring of lower bearing unit 170 is positioned adjacent the bottom of star member 164 within the bushing and is fitted down against an inwardly extending flange of the bushing which cooperates with flange 180 of the star member. A spacer member 182, within the bushing, engages the upper side of the outer ring of lower bearing unit 170 and the lower side of the outer ring of upper bearing unit 172. A cap 184 is fixedly mounted on the top of star member 164 having an annular flange which protrudes downwardly and fits against the top of the outer ring of upper bearing unit 172. Star member 164 is connected to cage 114 for positive movement therewith by a scissors unit 186.

Shaft 166 extends downwardly from star member 164 through the ball joint housing 100 and tubular member 55 into the lower portion of ball joint housing 34. Located around shaft 166, in surface-to-surface engagement therewith for a substantial length, is a tubular member 188. At the point where tubular member 188 passes through ball joint housing 100, it is shaped to have a bell-like or spherical surface 190. Mounted between said spherical surface 190 and ball joint housing 100, is a sectional spherical bearing seat formed by two members 192 and 194. These members are held in place in ball joint housing 100 against a shoulder 196 of ball joint housing 100 by a holding washer 198 fixed to the top of the housing 100 by bolts 200. This construction permits angular movement of tubular member 188 and therefore shaft 166 about the center "C" of the spherical surface 190. Shaft 166 in its surface-to-surface engagement with tubular member 188 is permitted axial movement therein. The means for angularly moving tubular member 188 and therefore shaft 166 will be hereinafter described as will be the means for axially moving shaft 166 within the tubular member 188.

The lower end of tubular member 188 is located approximately at the same point as the lower end of shaft 166, when the shaft 166 is in its extreme lower position. Tubular member 188 has an outwardly projecting flange 202 at its lower end. Fixed to the bottom of flange 202 is a cylinder and piston unit 204. This unit has an upper flange 206 which is bolted to flange 202 by bolts 208. The cylinder 210 of the unit 204 extends downwardly from flange 206 with its axis coinciding with the axis of tubular member 188. A piston 212 is mounted in said cylinder having a piston rod 214 extending through an opening at the upper end of the cylinder to a point adjacent the lower end of the shaft 166. The piston rod 214 has a packing therearound where it passes through the top of cyinder 210. The free end of piston rod 214 is threadably secured in the lower end of shaft 166 and fixed in place by a lock nut 216.

It can be seen that as the piston 212 is moved in an axial direction within its cylinder 210, it will move the shaft 166 within tubular member 188 the same distance. Since shaft 166 carries star member 164, the arms 165 are caused to move a like distance in the same direction that the shaft 166 is moved. With each arm 165 connected to a pitch horn 162, this movement of the star member 164 will cause a change in collective pitch, that is, a like change in pitch simultaneously, of all the blades 18.

Flange 206 of the cylinder piston unit 204 has two outwardly extending arms 218 and 220 which extend therefrom at an angle of 90° to each other. Arm 218 extends laterally to the side of the helicopter and arm 220 extends rearwardly (see Fig. 3). Arm 218 is connected to flange 38 by a cylinder and piston unit 222 and arm 220 is connected to flange 38 by cylinder and piston unit 224. Only one cylinder and piston unit will be described along with its connecting means and operating means since the two are identical.

Cylinder and piston unit 222 is formed having a cylinder 226 with an arm 228 extending from one end thereof along the axis of the cylinder. A piston 230 is positioned within the cylinder and has a piston rod 232 which extends through the opposite end of cylinder 226. The free end of arm 228 is connected to the free end of arm 218 by a universal joint 234 and the free end of piston rod 232 is connected to flange 38 by a universal joint 236. This provides for the lateral movement of the lower end of shaft 166. Cylinder and piston unit 224 provides for the fore and aft movement of the lower end of the shaft 166. These movements of shaft 166 at its lower end, pivot the shaft about point "C," the center of spherical surface 190. It can be seen that when fluid is admitted to cylinder 226 through passageway 238, the cylinder 226 will be moved to the left thereby moving the lower end of a shaft 166 to the left. The admission of fluid to cylinder 226 through passageway 240 will move cylinder 226 to the right thereby moving the bottom of shaft 166 to the right. These same actions occur when fluid is admitted to opposite ends of the cylinder of the cylinder and piston unit 224. However, in this instance, a fore and aft movement of the lower end of shaft 166 occurs. Movement of the lower end of shaft 166 to any position around its central location, as shown in Fig. 2, can be obtained by various combinations of fluid entry into the cylinder and piston units 222 and 224.

It can be seen that as the lower end of shaft 166 is moved about, thereby pivoting it around the center "C" of spherical surface 190, the shaft 166 is caused to be positioned at various angles to the rest of the rotor head. Since shaft 166 carries star member 164, this member 164 is caused to tilt in a plane which is normal to the axis of shaft 166. With each arm 165 connected to a pitch horn 162, this movement of the star member 164 to a tilted plane will cause the rotor head to impart a cyclic pitch to the blades, that is, the blades will constantly change pitch as they rotate about shaft 166, the amount of pitch change will depend on the given distance the end of each arm 165 travels from a plane normal to the rotor head.

Means for admitting fluid to the cylinders of these units 222 and 224 comprises a servo valve 242 which is fixed thereto and therefore provides a follow-up movement. The servo valve 242 is the same for both units so only its connection to unit 222 will be described. The valve comprises a housing attached to cylinder 226 with a bore therein. Passageways 238 and 240 extend from cylinder 226 into said bore. A valve member 244 is slidably mounted in said bore having two lands 246 and 248. The lands are positioned so that land 246 covers the opening to passageway 238 and land 248 covers the opening to passageway 240. An actuating rod 250 extends through the housing at one end of the bore to the exterior thereof for movement of said valve member 244. An actuating fluid passagaewy extends into said bore between lands 246 and 248 and a drain passage extends one from each end of said bore. An actuating fluid can be supplied from any suitable source. A similar servo mechanism is shown in U.S. application Serial No. 570,736, filed March 12, 1956, to Walter Gerstenberger for a Hydraulic Booster Control.

Movement of the actuating rod 250 will direct fluid to one side or the other of its cooperating cylinder 226 of either unit 222 or 224 and the follow-up movement of cylinder 226 will replace passageways 238 and 240 over the lands 246 and 248 of the actuating rod. This type of device permits a control to move the actuating rods 250 to relocate shaft 166 in a given position to obtain a desired cyclic pitch change.

The control for the movement of actuating rods 250 can comprise any given linkage which will extend from a cyclic control stick in a pilot's compartment so that the pilot receives a proper response to his movement of the control stick. That is, a movement of a cyclic control stick to obtain a forward tilting of the star member 164 should move the actuating rod 250 of unit 224 so that fluid is admitted through passageway 240 to the rear of piston 230. A linkage to properly move another type rotor head is shown in U.S. application Serial No. 570,736 referred to above.

The means for admitting fluid to one side or the other of piston 212 to obtain a desired collective pitch change in the blades 18 can comprise a servo valve similar to the valve 242 described above for use with the units 222 and 224. If this type of servo valve were used in this instance, it could be mounted on shaft 166 by arms 260 extending through a slot 262 in tubular member 188. Here again, the control for the movement of the actuating rod of the servo valve on shaft 166 can comprise any given linkage which will extend from a collective pitch stick in a pilot's compartment so that the pilot receives a proper response to his movement of the pitch stick. That is, a movement of a collective pitch stick to obtain an upward movement of star member 164 should move the actuating rod of the servo valve on shaft 166 so that fluid is admitted through passageway 238a. However, any known servo piston operating means can be used which will direct a given amount of fluid to one side of piston 212 and direct a given amount of fluid from the opposite side of piston 212 in response to a collective pitch stick movement. Some of the control mechanism is shown in schematic form to make its operation more easily understood.

Power to rotate the rotor head is directed thereto through the shafts 64. While only two such shafts are used in the rotor head described in this application, it is to be understood that if more input drive shafts are wanted, it is only necessary to provide another drive supporting member 52 having the desired number of raised portions 60 to receive the desired number of drive shafts.

The drive from each engine to the shaft 64 is shown in Fig. 4. Engine 20 has an output shaft 270 drivingly connected to an upstanding stub shaft 272 by gearing system 274. Shaft 272 has a brake 276 located thereon under control of the pilot. The driving end of shaft 272 enters a one-way clutch 278 which has its output connected to a drive shaft 280. This drive shaft 280 is connected to the shaft 64 of the shaft gear 62 by coupling 282. This connecting of shaft 280 to shaft 64 will be hereinafter described. Engine 22 has its output shaft connected to the other shaft 64 of the rotor head by similar connecting means. However, the interconnecting gear mechanism of engine 22 includes an output drive shaft 284 to the tail rotor 14.

The lower end of shaft 64 which projects below ball bearing assembly 76 is splined. Coupling 282, below said shaft, comprises three sections. The upper section comprises a cylindrical portion 286 which is internally splined and located over the splines of shafts 64. The upper end of this cylindrical portion 286 contacts the bottom of the inner ring of the ball bearing assembly 76 and fixedly positions it on shaft 64 against a fixed flange on the shaft. A nut 288 is positioned on the end of shaft 64 against the lower end of cylindrical member 286 to hold it in place. A flange 290 extends downwardly from the end of cylindrical portion 286 ending in three equally spaced fingers 292. The free end of shaft 280 has a flange 294 fixed thereto and extending upwardly with three fingers 296 equally spaced about. A connecting plate 298 having six equally spaced fingers is positioned between the free ends of flanges 290 and 294. The three fingers 292 of flange 290 are fixedly connected to three alternately spaced fingers of connecting plate 298 by bolts 300. The three fingers 296 of flange 294 are connected to the three remaining alternate fingers of the connecting plate 298. It can be seen that this connection provides a flexible drive between the shaft 280 and shaft 64. This is desirable in view of the resilient mounting of the rotor head.

To absorb the torque transmitted to the rotor head, torque rods 302 and 304 are provided. Torque rod 304 is connected at one end to bell shaped housing 34 by a bracket 306 and is connected at its other end to the fuselage by a bracket 308. Torque rod 302 is connected at one end to bell shaped housing 34 by a bracket 310 and is connected at its other end to the fuselage by a bracket 312. These torque rods permit vibrations in the rotor head to be isolated by the flexible mounting arrangement without placing a twisting movement on the mounting bands due to the torque transmitted to the rotor head from the engines.

It is to be understood that the invention is not limited to the specific embodiment herein illustrated and described, but may be used in other ways without departure from its spirit as defined by the following claims.

I claim:

1. In a helicopter having a fuselage, an upstanding hollow housing on said fuselage having an open upper end, a rotor journalled for rotation about the exterior of said housing, blades mounted on said rotor for pitch changing movement, drive means located internally in said housing for driving said rotor, means extending over the upper end of said housing operatively connecting said rotor and said drive means, means located internally of said housing for changing the blade pitch, and means extending over the upper end of said housing operatively connecting the blades and said pitch changing means.

2. In a helicopter having a fuselage, an upstanding hollow housing on said fuselage having an open upper end, said housing being fixed to said fuselage against rotation, a rotor journalled for rotation about the exterior of said housing, blades mounted on said rotor for pitch changing movement, drive means for said rotor being located in the interior of said housing, means operatively connected to said rotor and said drive means for forming a driving connection therebetween, said last named means extending over the upper end of said housing, actuating means for changing the blade pitch being located in the interior of said housing, and means operatively connected to said blades and actuating means for transmitting movements from said actuating means to said blades to change their pitch.

3. In a helicopter having a fuselage, an upstanding hollow housing on said fuselage having an open upper end, said housing being fixed to said fuselage against rotation, a rotor journalled for rotation about the exterior of said housing, blades mounted on said rotor for pitch changing movement, drive means for said rotor being located in the interior of said housing, means operatively connected to said rotor and said drive means for forming a driving connection therebetween, said last named means extending over the upper end of said housing, actuating means for changing the blade pitch being located in the interior of said housing, and means operatively connected to said blades and actuating means for transmitting movements from said actuating means to said blades to change their pitch, said last named means extending over the upper end of said housing.

4. In a helicopter having a fuselage, an upstanding hollow housing on said fuselage having an open upper end, said housing being fixed to said fuselage against rotation, a rotor journalled for rotation about the exterior of said housing, blades mounted on said rotor for pitch changing movement, drive means for said rotor being located in the interior of said housing, said drive means including a planetary system, said hollow housing having flange means extending from its interior, said planetary system being supported on said flange means, means operatively connected to said rotor and said drive means for forming a driving connection therebetween, said last named means extending over the upper end of said housing, actuating means for changing the blade pitch being located in the interior of said housing, and means operatively connected to said blades and actuating means for transmitting movements from said actuating means to said blades to change their pitch.

5. In a helicopter having a fuselage, an upstanding hollow housing on said fuselage having an open upper end, said housing being fixed to said fuselage against rotation, a rotor journalled for rotation about the exterior of said housing, blades mounted on said rotor for pitch changing movement, drive means for said rotor being located in the interior of said housing, said drive means including a planetary system, said hollow housing having flange means extending from its interior, said planetary system being supported on said flange means, means operatively connected to said rotor and said drive means for forming a driving connection therebetween, said last named means extending over the upper end of said housing, tubular means fixed to said flange means with its axis in substantially a vertical position, actuating means for changing the blade pitch being located in said tubular means, and means operatively connected to said blades and actuating means for transmitting movements from said actuating means to said blades to change their pitch.

6. In a helicopter having a fuselage, an upstanding hollow housing having an open upper end and an open lower end, a rotor journalled for rotation about the exterior of said housing, blades mounted on said rotor for pitch changing movement, a member on said fuselage having a channel section to receive the lower end of said housing, said lower end of said housing being resiliently mounted in said channel section, drive means in said housing for driving said rotor, means operatively connecting said rotor and said drive means, means in said housing for changing the blade pitch, and means operatively connecting the blades and said pitch changing means.

7. In a helicopter having a fuselage, an upstanding hollow housing having an open upper end and an open lower end, a rotor journalled for rotation about the exterior of said housing, blades mounted on said rotor for pitch changing movement, a member on said fuselage having a channel section to receive the lower end of said housing, said lower end of said housing being resiliently mounted in said channel section, drive means in said housing for driving said rotor means operatively connecting said rotor and said drive means, means in said housing for changing the blade pitch, means operatively connecting the blades and said pitch changing means, and torque transmitting means located between the housing and fuselage.

8. In a helicopter having a fuselage, an upstanding hollow housing having an open upper end and an open lower end, a rotor journalled for rotation about the exterior of said housing, blades mounted on said rotor for pitch changing movement, a member on said fuselage having a channel section to receive the lower end of said housing, said lower end of said housing being resiliently mounted in said channel section, drive means in said housing for driving said rotor, means operatively connecting said rotor and said drive means, means in said housing for changing the blade pitch, means operatively connecting the blades and said pitch changing means, and a torque rod connected between the housing and fuselage for transmitting torque therebetween.

9. A helicopter including in combination, a fuselage, first means fixed to the fuselage against rotation and extending upwardly therefrom, said first means including a housing open at the top, rotatable means mounted around the top of said first means, said first means having a first tubular member fixed in said housing with its axis in substantially a vertical position, said first means having first flange means interconnecting the interior of said housing with said first tubular member, first pinion gears supported by said flange means, a first ring gear encircling said pinion gears and meshing with them, an annular sun gear located around said first tubular member, second flange means interconnecting said ring gear and sun gear, second pinion gears meshing with said sun gear, said second pinion gears being mounted on said rotatable means, a second ring gear fixed to said first means meshing with said second pinion gears, blades mounted on said rotatable means for pitch changing movement, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, and second means operatively connected to the top of said rod and said blades to transmit movements of said rod to said blades.

10. A helicopter including in combination, a fuselage, first means fixed to the fuselage against rotation and extending upwardly therefrom, said first means including a housing open at the top, rotatable means mounted around the top of said first means, said first means having a first tubular member fixed therein with its axis in substantially a vertical position, said first means having first flange means interconnecting it with said first tubular member, drive means extending through said first flange means, planetary gearing in said housing connecting said drive means to said rotatable means, blades mounted on said rotatable means for pitch changing movement, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, and second means operatively connected to the top of said rod and said blades to transmit movements of said rod to said blades.

11. A helicopter including in combination, a fuselage, first means fixed to the fuselage and extending upwardly therefrom, said first means including a housing open at both top and bottom, rotatable means mounted around the top of said first means, said first means having a first tubular member fixed therein with its axis in substantially a vertical position, said first means having first flange means interconnecting it with said first tubular member, drive means extending through said first flange means, planetary gearing connecting said drive means to said rotatable means, blades mounted on said rotatable means for pitch changing movement, a pitch horn extending from each blade, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, second means operatively connected to the top of said rod and said blades to transmit movements of said rod to said blades, third means connected to the bottom of said rod for moving said rod axially, and fourth means connected to the bottom of said second tubular member for moving said member about the center of the spherical surface.

12. A helicopter including in combination, a fuselage, first means fixed to the fuselage and extending upwardly therefrom, said first means including a housing open at both top and bottom, rotatable means mounted around the top of said first means, said first means having a first tubular member fixed therein with its axis in substantially a vertical position, said first means having first flange means interconnecting it with said first tubular member, drive means extending through said first flange means, planetary gearing connecting said drive means to said rotatable means, blades mounted on said rotatable means for pitch changing movement, a pitch horn extending from each blade, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, second means operatively connected to the top of said rod and said blades to transmit movements of said rod to said blades, third means connected to the bottom of said rod for moving said rod axially, fourth means connected to the bottom of said second tubular member for moving said member about the center of the spherical surface, said third means including a piston fixed to the bottom of said rod, and a cylinder positioned around said piston, said cylinder being mounted against axial movement.

13. A helicopter including in combination, a fuselage, first means fixed to the fuselage and extending upwardly therefrom, said first means including a housing open at both top and bottom, rotatable means mounted around the top of said first means, said first means having a first tubular member fixed therein with its axis in substantially a vertical position, said first means having first flange means interconnecting it with said first tubular member, drive means extending through said first flange means, planetary gearing connecting said drive means to said rotatable means, blades mounted on said rotatable means for pitch changing movement, a pitch horn extending from each blade, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, second means operatively connected to the top of said rod and said blades to transmit movements of said rod to said blades, third means connected to the bottom of said rod for moving said rod axially, fourth means connected to the bottom of said second tubular member for moving said member about the center of the spherical surface, said fourth means including a piston fixed to said fuselage, and a cylinder positioned around said piston, said cylinder being fixed to the bottom of said second tubular member.

14. A helicopter including in combination, a fuselage, first means fixed to the fuselage and extending upwardly therefrom, said first means including a housing open at both top and bottom, rotatable means mounted around the top of said first means, said first means having a first tubular member fixed therein with its axis in susbtantially a vertical position, said first means having first flange means interconnecting it with said first tubular member, drive means extending through said first flange means, planetary gearing connecting said drive means to said rotatable means, blades mounted on said rotatable means for pitch changing movement, a pitch horn extending from each blade, a second tubular member in said first tubular member, said second tubular member having a spherical surface thereon, said first tubular member having a spherical seat therein into which said spherical surface is cooperatively positioned thereby permitting said second tubular member to move about the center of the spherical surface providing an angular movement of the second tubular member to the first tubular member, a rod mounted in said second tubular member for axial movement, second means operatively connected to the top of said rod and said blades to transmit movements of said rod to said blades, third means connected to the bottom of said rod for moving said rod axially, fourth means connected to the bottom of said second tubular member for moving said member about the center of the spherical surface, said third means including a piston fixed to the bottom of said rod, a cylinder positioned around said piston, said cylinder being mounted against axial movement, said fourth means including a piston fixed to said fuselage, and a cylinder positioned around said piston, said cylinder being fixed to the bottom of said second tubular member.

15. In a helicopter having a fuselage, an upstanding hollow mast on said fuselage having an open upper end, said mast being fixed against rotation, a rotor journalled for rotation on said mast, blades mounted on said rotor for pitch changing movement, drive means located in said mast for driving said rotor, means extending over the upper end of said mast operatively connecting said rotor and said drive means, means located in said mast for changing the blade pitch, and means extending over the upper end of said mast operatively connecting the blades and said pitch changing means.

16. In a helicopter having a fuselage, an upstanding hollow housing on said fuselage having an open upper end, a rotor, said housing having an outer surface around its exterior, bearing means located between said surface and said rotor mounting said rotor for rotation on the exterior of said housing, blades mounted on said rotor for pitch changing movement, drive means located internally of said housing for driving said rotor, means connecting said drive means and rotor extending over the upper end of said housing, means located internally of said housing for changing blade pitch, and means extending over the upper end of said housing operatively connecting the blades and said pitch changing means.

17. In a helicopter having a fuselage, an upstanding hollow housing on said fuselage having an open upper end, a rotor, said housing having an outer surface around its exterior, bearing means located between said surface and said rotor mounting said rotor for rotation on the exterior of said housing, blades mounted on said rotor at a point below the upper end of said hollow housing, said blades being mounted for pitch changing movement, drive means located internally of said housing for driving said rotor, means connecting said drive means and rotor extending over the upper end of said housing, means located internally of said housing for changing blade pitch, and means extending over the upper end of said housing operatively connecting the blades and said pitch changing means.

18. In a helicopter having a fuselage, an upstanding hollow housing on said fuselage having an open upper end, a rotor journalled for rotation about the exterior of said housing, blades mounted on said rotor for pitch changing movement, drive means located internally in said housing for driving said rotor, means operatively connecting said rotor and said drive means, actuating means passing through said housing for changing the blade pitch, means extending over the upper end of said housing operatively connecting the blades and said pitch changing means, said actuating means including inner and outer telescoping members, said outer member having a spherical surface thereon, and a spherical seat fixed to said housing for receiving said spherical surface of said outer member.

References Cited in the file of this patent

UNITED STATES PATENTS

| | | |
|---|---|---|
| 2,088,413 | Hafner | July 27, 1937 |
| 2,395,143 | Prewitt | Feb. 19, 1946 |
| 2,811,324 | Alex | Oct. 29, 1957 |
| 2,845,132 | Heckman | July 29, 1958 |

FOREIGN PATENTS

| | | |
|---|---|---|
| 481,023 | Canada | Feb. 12, 1952 |
| 494,793 | Canada | July 28, 1953 |
| 734,888 | Great Britain | Aug. 10, 1955 |